3,082,093
PROCESS FOR PRODUCING REFRESHING BEVERAGE FROM OIL-FREE SOYBEAN FLAKE

Aikichi Nagata, Hiroshi Yamamoto, and Shiro Terashima, Tokyo, Taizi Matsumoto, Kawasaki-shi, Kanagawa-ken, Shoichi Onishi, Tokyo, and Shimpachi Konishi, Kawasaki-shi, Kanagawa-ken, Japan, assignors to Ajinomoto Kabushiki Kaisha, Tokyo, Japan, a corporation of Japan
No Drawing. Filed Sept. 6, 1960, Ser. No. 53,930
Claims priority, application Japan Sept. 12, 1959
10 Claims. (Cl. 99—98)

This invention relates to processes for obtaining an acid-sugar extract from soybean flake and to process for producing beverages. An object of the present invention is to produce refreshing beverages of high quality economically and by very simple operations from low-cost oil-free soybean flake which is obtained abundantly as a byproduct in the production of soybean oil.

A process for producing refreshing beverages from oil-free soybean flake according to the invention is characterized in that an acidic liquid is obtained either by extracting oil-free soybean flake with water in the presence of a cation exchange resin or by first extracting oil-free soybean flake with water and then treating the extraction liquid with a cation exchange resin, the acidic liquid being treated with a decoloring agent and the decolored liquid, after being concentrated or diluted being treated with sweetening agents, perfumes, coloring agents, nourishing elements and the like.

Generally, refreshing beverages are known which contain carbonic acid or organic acids which are present in free condition and give a sour taste. For example, lemonade, cider and soda water beverages contain carbonic acid as a principal ingredient, while orange juice, grape juice and other fruit juices generally contain citric acid or other organic acids as their principal ingredients. Lactic acid bacilli beverages containing lactic acid as a principal ingredient and various cola beverages are also examples of refreshing beverages. The increased consumption of these refreshing beverages is evidenced by the increased juices.

In the preparation of fruit juices, natural fruits are squeezed and to the obtained juices are added sweetening agents, organic acids, coloring materials, perfumes and the like. Sometimes various synthetic compounds are used instead of genuine fruit juices by giving them flavours similar to desired particular fruit juices.

When beverages are produced from genuine fruits, the production is subject to various conditions such as price, availability of supply and quality of the fruit. Further, there are involved difficulties in collection and transportation. Consequently it is not only difficult to produce juices of standard quality but it is often unavoidable that the cost of production is high.

On the other hand, while synthetic beverages can be produced at relatively low cost, they are generally not as good in quality as those based on genuine fruit juices and it is very difficult to obtain products of high quality.

A further object of the present invention is to overcome the difficulties noted above in the production of refreshing beverages and, to this end, it has been found that oil-free soybean flake contains a great amount of organic acids which can be effectively utilized in the production of refreshing beverages. Among these organic acids, the principal one is citric acid and other include malic acid, tartaric acid, succinic acid and so forth.

As free soybean flake is very cheap and can be obtained easily and abundantly, the operation of the present invention is simple and easy and the cost of production is low. As an added advantage, the quality of the product is high Further, the present invention develops a new field in the utilization of oil-free soybean flake which has no been heretofore known.

The details of the present invention will be explained with reference to some preferred examples.

One part of oil-free soybean flake is introduced into an extraction vessel and 5 parts of water are added. Then a bag of synthetic textile containing 0.7 part of a cation exchange resin is thrown into the extraction water and extraction is carried out for 1 hour at room temperature under agitation. The bag of resin is raised from the liquid and the solid materials are separated from the extraction liquid by centrifuging. The extraction liquid amounting to 4 parts has a pH of 3.2 and has a very refreshing sour taste. The analysis of acids contained in the liquid is as set forth in Table I. (In Table I, the composition of the acid content of the juice of a mandarin orange is also described for the convenience of comparison.)

TABLE I
*Acid Composition of Extraction Liquid*

|  | Extraction liquid, percent | Mandarin orange juice, percent |
|---|---|---|
| Citric acid | 70 | 72. |
| Succinic acid | trace | 15. |
| Malic acid | 8 | 9. |
| Tartaric acid | 5 | 1. |
| Phosphoric acid | 14 | |

As seen from Table I, the acid composition of th extraction liquid is composed mainly of organic acid such as citric acid, malic acid and tartaric acid and resembles the acid composition of the juice of a mandari orange.

The sugar content, acid content and the results of a analysis of the other elements in the extraction liquid ar set forth in Table II. (In Table II, for the convenienc of comparison, the values of extraction liquid which concentrated to ¼ volume are described along with th values of the juice of a Chinese citron and juice of mar darin orange according to the standard of the Ministr of Agriculture and Forest in Japan and the value of canned orange juice commercially available.)

TABLE II

|  | Sugar content (g./dl.) | Acid content (g./dl. as citric acid) | Ratio of sugar content to acid content | Nitroge (mg./dl. |
|---|---|---|---|---|
| Extraction liquid | 2.5 | 0.5 | 5.0 | |
| Extraction liquid concentrated to ¼ | 10.0 | 2.0 | 5.0 | |
| Chinese citron | 9.0 | 2.0 | 4.5 | |
| Mandarin orange | 10.0 | 0.7 | 14.3 | |
| Canned orange juice from market | 10.1 | 0.5 | 20.2 | |

As apparent from Table II, the extraction liquid wi have a composition substantially similar to that of a mai darin orange or canned orange juice when it has suga added thereto, and extraction liquid concentrated to ¼ volume has practically the same composition as that a Chinese citron. It can be understood, therefore, th refreshing beverages can be very readily prepared fro such extract liquids.

The extraction liquid obtained by conducting extra tion on oil-free soybean flake with water in the presen of a cation exchange resin has a composition which very similar to that of fruits. However, it contain various elements which may cause a disagreeable or peculiar odor and coloring, and hence it is not suitable for use in a beverage and requires decoloring and deodorizing for such use. However, these elements attributable to the odor and color of soybeans can be easily removed with adsorption by active carbon or decoloring agents such as decoloring resins. In fact, the odor and coloring of soybeans can be removed by simple treatment of the extract liquid with decoloring agents thereby achieving simultaneously decoloring and deodorizing. By this operation, colorless and odorless refined liquid can be obtained very advantageously without requiring separate decoloring and deodorizing operations.

The refined liquid obtained by the treatment with decoloring agent is, however, not sweet enough because of insufficient sugar content. It is therefore sweetened by adding sweetening agent such as sucrose, glucose, maltose, honey, sorbite or synthetic sweetening agent. Further, there may be added, if desired, perfumes, emulsifiers, nourishments, and so forth to obtain any predetermined compositon for providing a refreshing beverage.

As explained above, the process of the present invention comprises three steps, the extraction step wherein oil-free soybean flake is extracted with water in the presence of a cation exchange resin, the refining step wherein acidic liquid obtained by extraction is treated with a decoloring agent, and the finishing step wherein the refined liquid is adjusted to desired composition thereby to give a final product. Each of these steps may be modified in various ways as will be explained more fully in the following.

Firstly, as to the extraction step, the extraction is conducted by maintaining oil-free soybean flake and a cation exchange agent in a common extraction medium such as water. When the extraction is thus conducted, water-soluble substances in oil-free soybean flake, namely carbohydrates, ash contents (mainly potassium or calcium probably present as salts combined with acid) and protein, are dissolved out of the soybeans and they contact the cation exchange resin which adsorbs cations. Consequently the concentration of cations in the liquid is lowered while anions are freed according to the decrease of cations. Thus the value of pH of the extraction liquid is gradually lowered until it reaches a substantially constant value of 3-4. As well known, the isoelectric point of protein is about pH 4, and the solubility of protein is minimum at the isoelectric point.

In accordance with the present invention, the extraction is conducted at a point near the isoelectric point of protein in the absence of alkali salt. Hence the solubility of protein is extremely low and there occurs practically no dissolving out of the protein while the carbohydrate and ash content is effectively extracted and the cations are immediately adsorbed by the resin to leave carbohydrates and anions in accumulation in the liquid. The anions are organic acids, the major part being citric acid as already mentioned, while the carbohydrates are composed mainly of sucrose mixed with other sugars such as stachyose and raffinose. Thus an acid-sugar liquid suitable for a refreshing beverage is obtained. If the extraction step is considered as a step for the recovery of protein from oil-free soybean flake, it is again very useful since it improves greatly the purity of protein of oil-free soybean flake due to the extraction and removal of carbohydrates and ash contents without accompanying loss of protein. Thus this process gives batch refined oil-free soybean material useful in food industries and acid-sugar liquid, and thus attains simultaneously the refining of protein.

The extraction step may be modified as described in the following and said modification achieves an effect similar to that already described. Oil-free soybean flake may be extracted solely with water and separated into solids and the extraction liquid. Then the extraction liquid may be treated with a cation exchange resin to decompose salts dissolved in the extraction liquid and to adsorb cations by means of the resin thereby emancipating organic acids and lowering the pH to 3-4 thereby coagulating and precipitating protein. When the precipitated protein is separated, an acid-sugar liquid having the same composition as the acid-sugar liquid described before is obtained. The separated protein contains practically no impurities and is a soybean protein of very high purity.

As stated above, the extraction of the invention is conducted to obtain acid-sugar liquid either by extracting oil-free soybean flake with water in the presence of a cation exchange resin, or by treating with cation exchange resin the extraction liquid obtained by extracting with water. For the cation exchange resin used in the present invention, any resin may be used as long as it is capable of decomposing neutral salt and adsorbing cation ions, but cation exchange resins which have sulfonic acid radicals as their functional radicals, are particularly suitable. Complex type cation exchange resins having sulfonic acid radicals as their main functional radicals and cation exchange resins having phosphoric acid radicals as their functional radicals can also be used.

The amount of cation exchange resin used should preferably be more than 0.3 part per 1 part of oil-free soybean flake and the best result is obtained when 0.6–0.8 part of the resin is used.

The extraction medium, that is water, is used at the rate of 4–7 parts of water per one part of soybeans and 5 parts is preferred. However, the amounts of cation exchange resin and water to be used may be altered as desired and according to requirements as a matter of course. The treatment temperature in the extraction step has scarcely any effect on the result. The cation exchange resin used in the extraction may be regenerated by treatment with dilute mineral acid according to conventional method and reused repeatedly. In the regeneration of the resin, mineral salts, mainly potassium salts, are recovered from the effluate.

In the refining step, the disagreeable soybean odor and the coloring materials of the acid-sugar liquid are removed by the treatment with a decoloring agent. This decoloring and deodorizing are important in the preparation of a refreshing beverage which has no commercial value if it is not satisfactory in color, odor, and taste inclusive. Accordingly, if the disagreeable odor of soybeans and the coloring materials are not completely removed in the refining step, it is impossible to use the above described acid-sugar liquid as a refreshing beverage.

The inventors have found, however, that the substances to which are attributable the odor and color are readily adsorbed and removed completely by adsorption by a decoloring agent such as active carbon or a decoloring resin. Thereby, a liquid having a very pleasant sour taste is recovered which is free from color, odor and any inherent disagreeable taste of soybeans. This is one of the very important advantages in the industrial application of the present invention.

For the decoloring agent in the refining step of the present invention, any active carbon or substantially neutral porous decoloring synthetic resins having intrinsically no ion exchange function may be used. However, it is convenient to use a decoloring resin since this has a strong function of adsorbing materials having a disagreeable odor and can be used repeatedly by regeneration after use. It is also possible to carry out extraction and refining steps simultaneously by having a cation exchange resin and a decoloring agent co-present in the extraction water.

Finally the finishing step will be explained in greater detail. The liquid obtained by the extraction and refining steps of the present invention is a colorless transparent odorless acid-sugar liquid having a refreshing sour taste with no peculiar disagreeable flavor, but the ratio of sugar to acid is too low and it is not suitable for use as a beverage as it is because of insufficient sweetness. However, when a proper amount of sweetening agent is added thereto to increase the ratio of sugar to acid, the flavor is remarkably improved and a refreshing beverage of excellent quality is obtained. The obtained product may be marketed directly as a refreshing beverage. However, it is colorless, transparent and odorless. If desired, there may be added selected coloring agents and perfumes to prepare a refreshing beverage having any desired color and flavor. If sweetening agents and perfumes are added to the above mentioned acid-sugar liquid after it has been concentrated, a concentrated refreshing beverage is obtained. It is further possible to prepare with no difficulty a carbonic beverage by saturating the acid-sugar liquid with carbonic anhydride, or a fruit juice by adding any desired natural fruit juice to the acid-sugar liquid in any desired ratio. If nourishing substances such as vitamins and amino acids are added to the liquid in the finishing step, a refreshing beverage having increased nourishment may be obtained.

As described above, the present invention provides an entirely new and advantageous process for producing a very useful refreshing beverage from oil-free soybean material.

In the following, some further examples will be described.

EXAMPLE 1

1 kg. of oil-free soybean flake (total nitrogen 8.20%, ash 5.8%) is charged in an extraction vessel, and 700 ml. of an H-type cation exchange resin are separately charged into a resin vessel separately. These two vessels are connected to each other with a pipe and 5 l. of water are circulated by means of a pump to carry out extraction. After conducting extraction for about one hour at room temperature, solids are separated from the extraction liquid and 705 g. of refined oil-extracted soybeans (total nitrogen 11.3%) are obtained by drying the separated solids. The extraction liquid amounting to about 4 l. is slightly colored and contains 2.5 g./dl. of sugar, 0.5 g./dl. of organic acids (as citric acid) and 0.025 g./dl. of total nitrogen and exhibits a pH of 3.2. This extraction liquid is sterilized by heating at 80° C. for 30 minutes and then is passed through a column filled with 400 ml. of decoloring resin. A colorless, transparent, odorless acidic liquid having an agreeable sour taste is obtained.

When this acidic liquid has 200 g. of sugar added thereto, and 4 g. of sodium cyclosulfamate and coloring agents and perfumes which give the flavor of an orange thoroughly mixed therein, 4 l. of a beverage like orange juice and having an excellent flavor is obtained.

EXAMPLE 2

Oil-free soybean flake amounting to 1 kg. is charged into an extraction vessel and extraction is carried out for one hour at room temperature by adding 5 l. of water. By separating solids by centrifuging, 4 l. of the extraction liquid is obtained.

600 ml. of an H-type cation exchange resin is placed into a bag of synthetic textile and the liquid is then agitated mildly with the bag introduced into the liquid. Cations are adsorbed by the resin and organic acids are freed to lower the pH thereby coagulating and precipitating protein. Precipitated protein is separated by centrifuging and settlement and an acidic aqueous solution obtained is subjected to heat treatment and thereafter is decolored and deodorized with active carbon.

Then 200 g. of sugar, 4 g. of sodium cyclosulfamate and perfumes and a coloring agent are added. Further added are 5 g. of lysine hydrochloride and 1.6 g. of vitamin C and the flavor is adjusted to obtain 4 l. of a refreshing beverage having increased nourishing effect.

What we claim is:

1. A process for obtaining an acid-sugar extract from oil-free soybean flake comprising adding water to oil-free soybean flake in the presence of a cation exchange resin in a ratio of about 4–7:1:.3–1 to obtain an acidic extraction liquid having a pH of about 3 to 4 and treating the acidic extraction liquid with a decolorizing agent which is intrinsically free of any ion exchange function to remove color and odor therefrom, said resin being capable of decomposing neutral salt and adsorbing cation ions.

2. A process as claimed in claim 1, wherein the decolorizing agent used is selected from the group consisting of active carbon and synthetic decolorizing resins having intrinsically no ion exchange function.

3. A process for producing a refreshing beverage from oil-free soybean flake comprising adding water to oil-free soybean flake in the presence of a sulfonic-cation exchange resin in a ratio of about 4–7:1:3–1 whereby an acidic extraction liquid is obtained which has a pH of 4–3, treating the acidic extraction liquid with a decolorizing agent selected from the group consisting of active carbon and decolorizing resins to remove color and odor elements, and adding flavor to the decolorized liquid.

4. A process for obtaining an acid-sugar liquid from oil-free soybean flake comprising adding water to oil-free soybean flake in a ratio of about 4–7:1 to obtain an extraction liquid containing sugars and organic salts, adding a cation exchange resin to the resultant extracted liquid in a ratio of about 1:.3–1 to free organic acids from said extraction liquid, separating the protein which precipitates therefrom, and treating the liquid containing the sugars and organic acids with a decolorizing agent which is intrinsically free of any ion exchange function to remove the color and odor therefrom.

5. A process as claimed in claim 4 comprising adding a flavoring agent.

6. A process for obtaining an acid-sugar extract from oil-free soybean flake comprising adding 4–7 parts of water to 1 part of oil-free soybean flake to obtain an aqueous extraction liquid and treating said extraction liquid with 0.3–1 part of a cation exchange resin which is capable of decomposing neutral salt and adsorbing cations to remove cations and lower the pH to about 3–4 whereby to render protein insoluble in the liquid.

7. A process for treating an extraction liquid obtained by the process of claim 6, comprising separating protein from said extraction liquid and then treating said liquid with a decolorizing agent to remove color and odor therefrom.

8. A process as claimed in claim 6, wherein the cation exchange resin used is a resin which contains a sulfonic acid radical as its functional radical.

9. A process as claimed in claim 6 wherein the cation exchange resin used is a resin having a phosphoric acid radical as a functional radical.

10. The decolorized and deodorized acid-sugar extract liquid produced by the process of claim 6.

References Cited in the file of this patent

UNITED STATES PATENTS 2,881,076    Sair _____ Apr. 7, 1959